No. 778,187.  PATENTED DEC. 20, 1904.
W. P. GRAY.
ADJUSTABLE PULLEY.
APPLICATION FILED APR. 22, 1904.
NO MODEL.
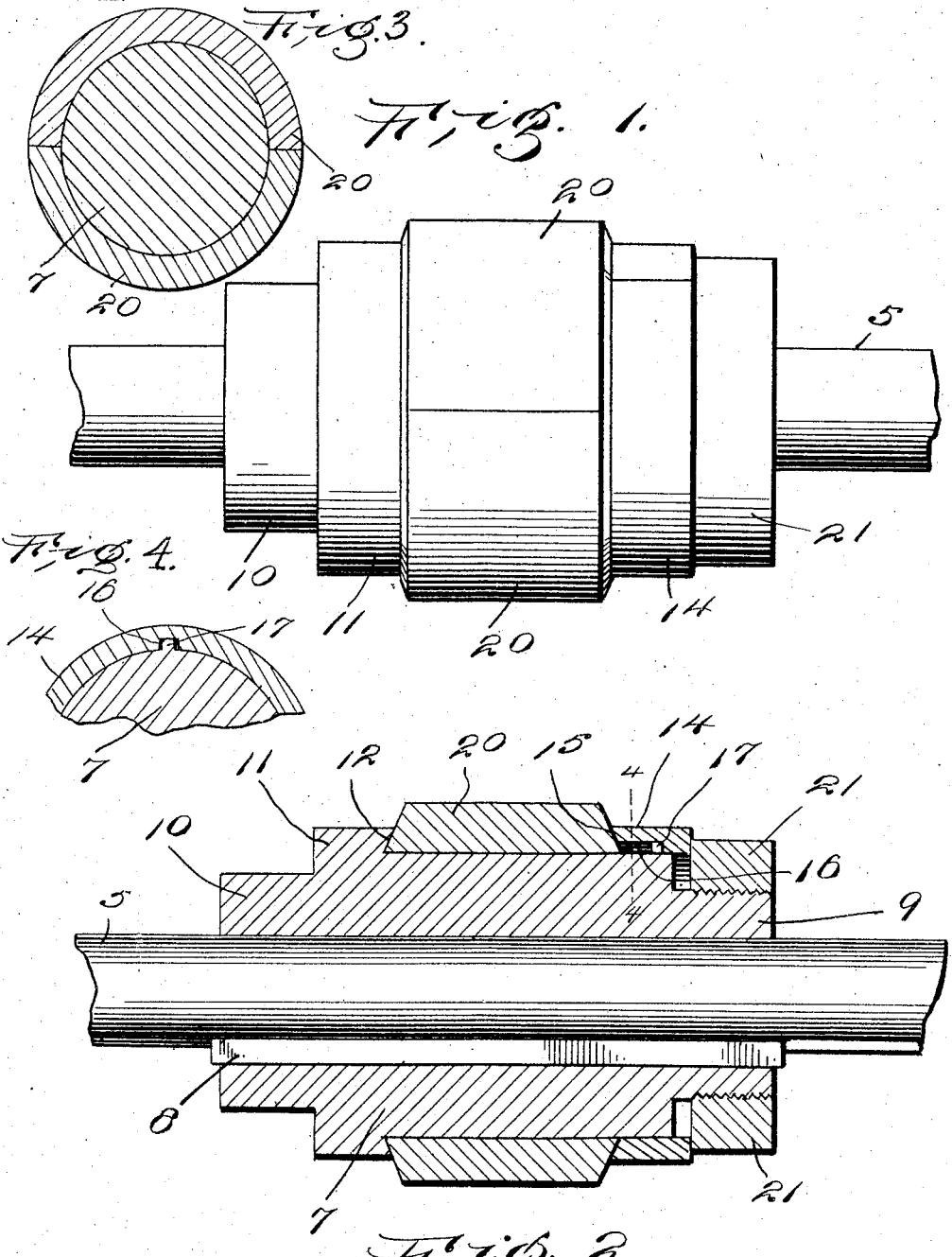
Witnesses
Inventor
W. P. Gray
By
Attorneys No. 778,187. Patented December 20, 1904.

UNITED STATES PATENT OFFICE.

WILLIAM P. GRAY, OF CAMPBELLTON, CANADA.

ADJUSTABLE PULLEY.

SPECIFICATION forming part of Letters Patent No. 778,187, dated December 20, 1904.

Application filed April 22, 1904. Serial No. 204,378.

*To all whom it may concern:*

Be it known that I, WILLIAM P. GRAY, a subject of the King of England, residing at Campbellton, in the Province of New Brunswick, Dominion of Canada, have invented certain new and useful Improvements in Adjustable Pulleys; and I do hereby declare the following to be a full, clear, and exact description of the invention, such as will enable others skilled in the art to which it appertains to make and use the same.

This invention relates to pulleys such as are employed in connection with shafting, either as driving-pulleys or driven pulleys, the object of the invention being to provide a construction wherein the pulley will be rigid when in use and in which parts thereof may be shifted for interchangeable application of rims or belt-receiving portions of different diameters to suit different specific conditions.

Other objects and advantages of the invention will be understood from the following description.

In the drawings forming a portion of this specification, and in which like numerals of reference indicate similar parts in the several views, Figure 1 is an elevation showing a pulley embodying the present invention mounted upon a shaft. Fig. 2 is a longitudinal section through the pulley. Fig. 3 is a transverse section through the central portion of the pulley. Fig. 4 is a section on line 4 4 of Fig. 2.

Referring now to the drawings, there is shown a shaft 5, upon which is mounted a pulley embodying said invention, said pulley including a hub 7, which is held against rotation on the shaft by means of a spline 8 or in any other suitable manner. The central portion of the hub 7 is of greater diameter than the end portions 9 and 10 thereof, and at the end of said central portion adjacent to the end 10 is formed a circumscribing flange 11, the side face of which in the direction of the end 9 is cut under or beveled inwardly, as shown at 12. A collar 14 is loosely mounted upon the end of the central portion of the hub 7 opposite to the flange 11, and the inner side face thereof is cut under or beveled, as shown at 15, corresponding to the bevel 12, the collar 14 having a recess 16 in its inner face, this recess or groove being disposed to receive a pin 17, that projects from the face of the hub 7, when the collar 14 is slid onto said hub longitudinally of the latter. The engagement of the pin with the groove serves to hold the collar against rotation on the hub. It will be noted that when the collar is in place on the hub 7 there is presented between the collar and the flange 11 a circumscribing groove about the hub which broadens inwardly or is of dovetailed shape, and this broadened or dovetailed groove is designed to receive the sections 20 or segments of a rim, the ends of which sections or segments are beveled to correspond to the bevels 12 and 15, respectively, so that these sections or segments may be clamped between the flange and collar and by reason of the bevels will be held securely against radial displacement. To exert this clamping action, a nut 21 is screwed onto the reduced end portion 9 of the hub 7, so as to impinge against the collar 14 and force it in the direction of the flange 11, it being noted that this clamping action serves not only to force the sections or segments 20 against the flange 11, but by reason of the contacting beveled faces the sections or segments are drawn toward the hub, and sufficient friction is insured to hold the segments from slipping on the hub.

With this construction it will be understood that by backing off the nut part way the collar 14 may be slipped rearwardly sufficiently far to permit of removal of the rim-segments and substitution of other segments of greater or lesser thickness to vary the diameter of the rim portion of the pulley. Thus there is provided a pulley which may be varied in diameter to suit different conditions of use.

It will be understood that in practice modifications of the specific construction shown may be made and any suitable materials and proportions may be used for the various parts without departing from the spirit of the invention.

What is claimed is—

A pulley comprising a hub having a circumscribing flange, a clamping-collar slidably disposed upon the hub and having a longitudinal groove in its inner face, said hub having a pin radiating therefrom and engaged in the groove, the inner side faces of said flange and
5 collar being cut under, a segmental rim removably disposed about the hub between the flange and collar, said segmental rim being broadened in the direction of the hub to fit the bevels of the flange and collar, and a nut engaged with the hub and movable against the collar to clamp the rim between it and the flange.

In testimony whereof I affix my signature in presence of two witnesses.

WILLIAM P. GRAY.

Witnesses:
   ALLAN C. MILLER,
   J. L. MILLER.